United States Patent [19]

Takanashi et al.

[11] Patent Number: 5,054,892
[45] Date of Patent: * Oct. 8, 1991

[54] PHOTO-TO-PHOTO CONVERSION ELEMENT AND ITS APPLIED SYSTEM

[75] Inventors: Itsuo Takanashi, Kamakura; Shintaro Nakagaki, Fujisawa; Hirohiko Shinonaga; Tsutou Asakura, both of Yokohama; Masato Furuya, Yokosuka, all of Japan

[73] Assignee: Victor Company of Japan, Ltd., Kanagawa, Japan

[*] Notice: The portion of the term of this patent subsequent to Apr. 24, 2007 has been disclaimed.

[21] Appl. No.: 485,933

[22] Filed: Feb. 27, 1990

Related U.S. Application Data

[60] Division of Ser. No. 313,073, Feb. 21, 1989, Pat. No. 4,920,417, which is a continuation-in-part of Ser. No. 139,005, Dec. 29, 1987, Pat. No. 4,831,452.

[30] Foreign Application Priority Data

Feb. 21, 1988 [JP] Japan .................................. 63-37800

[51] Int. Cl.$^5$ .......................... G02F 1/01; H04N 3/14
[52] U.S. Cl. ................................ 359/72; 358/213.13; 358/209; 359/245
[58] Field of Search ................... 358/209, 213.13, 217; 350/355, 342

[56] References Cited

U.S. PATENT DOCUMENTS

| | | | |
|---|---|---|---|
| 4,480,269 | 10/1984 | Yoshida et al. | 358/213.13 |
| 4,583,122 | 4/1986 | Ohwada et al. | 358/213.13 |
| 4,831,452 | 5/1989 | Takanashi et al. | 358/213.13 |
| 4,920,417 | 4/1990 | Takanashi et al. | 358/209 |

Primary Examiner—Eugene R. LaRoche
Assistant Examiner—Evelyn A. Lester
Attorney, Agent, or Firm—Michael N. Meller

[57] ABSTRACT

A photo-to-photo conversion element is disclosed. The element has, in an arranged sequence in line: a first optical member having a wavelength selectivity permitting passage of a write light having a first wavelength range and blocking an erase light; a first transparent electrode; a photoconductive layer; a second optical member having a wavelength selectivity permitting reflection of a read light having a second wavelength range and passage of the erase light; a third optical member for electrooptically modulating a light incident thereto through the second optical member in response to the strength distribution of an electric field applied thereto; and a second transparent electrode. The erase light has a wavelength outside of both the first and second wavelength ranges.

3 Claims, 4 Drawing Sheets

PHOTO-TO-PHOTO CONVERSION ELEMENT AND ITS APPLIED SYSTEM

This application is a divisional application of Ser. No. 313,073 filed Feb. 21, 1989, now U.S. Pat. No. 4,920,417, which was a continuation-in-part application of Ser. No. 139,005 filed Dec. 29, 1987, now U.S. Pat. No. 4,831,452.

BACKGROUND OF THE INVENTION

This invention relates to a photo-to-photo conversion element suitable for image pickup devices, optical writing projectors, and the like.

Image pickup devices using photo-to-photo conversion elements are free from problems encountered with conventional image pickup devices, and are therefore able to generate with ease a video signal for providing a reproduced pictorial image having high picture quality and high resolution.

An example of such an image pickup device constituted with photo-to-photo elements can be readily understood by making reference to Japanese Patent Application No. 311333/86 entitled "Image pickup device" filed on Dec. 30, 1986 by the assignee.

For a photo-to-photo conversion element having a structure capable of receiving an optical image and outputting an optical image also as its output, attention has been conventionally paid to elements, e.g., a liquid crystal optical modulator, a photoconductive Pockels cell, a spatial light element such as a microchannel light modulator, an element constituted by a photochromic material and the like as, e.g., an optical writing projector, an element for optical parallel processing of an optical computer, an element for recording a picture, etc. In addition, the assignee has also proposed an image pickup device having high resolution using photo-to-photo conversion elements.

FIG. 1 is a side cross-sectional view showing an example of the configuration of a conventional photo-to-photo element. The photo-to-photo conversion element shown in FIG. 1 has an arrangement comprising, in a stacked sequence, a glass plate 1, a transparent electrode 3, a photoconductive layer 7, a light screening or shielding layer 12, a dielectric mirror 8, an optical member (e.g., an optical modulation layer such as lithium niobate monocrystal or a nematic liquid crystal layer) 9 for changing the state of light in dependence upon an applied electric field, a transparent electrode 4, and a glass plate 2. This photo-to-photo conversion element is such that a write light WL, a read light RL, and an erase light EL are irradiated from the glass plate 1 side, the glass plate 2 side, and the glass plate 1 side, respectively.

In the photo-to-photo conversion element shown in FIG. 1, a circuit comprising a power supply 10 and a changeover switch SW is connected between terminals 5 and 6. By a switching control signal delivered to an input terminal 11 for the switching control signal in the changeover switch SW, the movable contact of the changeover switch SW is switched to the fixed contact WR side. Under this condition, a voltage of the power supply 10 is applied across the transparent electrodes 3 and 4, to therefore apply an electric field across both terminals of the optical member 9. Furthermore, when the write light WL is caused to be incident from the glass plate 1 side in the photo-to-photo conversion element to transmit the incident write light WL through the glass plate 1 and the transparent electrode 3 to reach the photoconductive layer 7, because the electric resistance value of the photoconductive layer 7 changes in correspondence to an optical image of the incident light which has reached the photoconductive layer 7, a charge image, corresponding to the optical image of the incident light which has reached the photoconductive layer 7, is produced at the boundary surface between the photoconductive layer 7 and the light screening layer 12.

Furthermore, under the condition where the movable contact of the changeover switch SW is switched to the fixed contact WR side as previously described, an electric field having a strength distribution corresponding to the charge image, having been produced by the write light as described above at the boundary surface between the photoconductive layer 7 and the light screening layer 12, is applied to the optical modulation layer 9 such as a lithium niobate monocrystal (or nematic liquid crystal layer) 9 provided so as to have a serial relationship with respect to the above-mentioned photoconductive layer 7 along with the light screening layer 12 and the dielectric mirror 8, etc. between transparent electrodes 1 and 2 across which a voltage of the power supply 10 is applied through terminals 5 and 6. Thus, the read light RL incident from the glass plate 2 side changes to a reflected light including pictorial image information corresponding to the strength of an electric field applied to the optical modulation layer 9 by the electro-optic effect of the optical modulation layer 9, and is thus emitted from the glass plate 2 side.

The light not reflected by the dielectric mirror 8 of the read light incident to the glass plate 2 side, as stated above, goes on through a path including the transparent electrode 4, the optical modulation layer 9, the dielectric mirror 8 and the light screening layer 12, and is screened by the light screening layer 12 so that it does not go further toward the photoconductive layer 7 side. For this reason, even if the read light RL is incident or projected to the glass plate 2 side, there is no possibility that the electric resistance value of the photoconductive layer 7 changes thereby. Thus, even read light RL incident to the photo-to-photo conversion element gives no possibility of a change in the charge image produced in correspondence with the optical image by the incident light at the boundary surface between the photoconductive layer 7 and the light screening layer 12.

On the other hand, in the above-mentioned photo-to-photo conversion element shown in FIG. 1, the information written thereinto by the write light WL will be erased as follows. First, a switching control signal is delivered to the input terminal 11 for the switching control signal in the changeover switch SW to switch the movable contact of the chageover switch SW to the fixed contact E side, to therefore allow the terminals 5 and 6 to have the same potential so that no electric field is produced across the transparent electrodes 3 and 4. Then, by allowing an erase light EL having a uniform strength distribution to be incident from the glass plate 1 side which is the incident side of the write light WL, the erase light EL is given to the photoconductive layer 7 through the glass plate 1 and the transparent electrode 3, thus placing the photoconductive layer 7 in the state where its electric resistance value is lowered to erase a charge image produced at the boundary surface between the photoconductive layer 7 and the light screening layer 12.

The reason why the side on which the erase light is incident for erasing the information having been already written into the conventional photo-to-photo conversion element shown in FIG. 1 stated above, is the same as side on which the write light WL in incident is as follows. Since there is the light screening layer 12 between the side of which the read light RL and the photoconductive layer 7, even if the erase light is caused to be some from the incident side on which the read light RL is incident, that erase light is stopped by the light screening layer 12, and therefore failing to reach the photoconductive layer 7. Accordingly, even if the erase light is caused to be same from the incident side on which the read light RL is incident, a charge image occurring at the boundary surface between the photoconductive layer 7 and the light screening layer 12 cannot be erased.

This is a serious problem when the photo-to-photo element is used, e.g., in an image pickup device of a structure such that it is required to provide an image pickup optical system on the side on which the write light WL is incident, or in a device of a structure such that it is difficult to provide the incident unit for the erase light on the side on which the write light WL is incident.

For a photo-to-photo conversion element which can solve the above-mentioned problem, the assignee has already proposed a photo-to-photo conversion element constructed as shown in FIG. 2, i.e., a photo-to-photo conversion element comprising, in a stacked sequence, a glass plate 1, a transparent electrode 3, a photoconductive layer 7, an optical member 8R having wavelength selectivity permitting a light in the wavelength region of the read light to be reflected and permitting light in the wavelength region of the erase light to be transmitted, an optical member 9 for changing the state of light in dependence upon an applied electric field, a transparent electrode 4, and a glass plate 2.

For such an optical member 8R, e.g., a member constituted by a dichroic filter comprised of a multilayer layer consisting of a thin film of $SiO_2$ and a thin plate of $TiO_2$ may be used.

Moreover, for the optical member 9, e.g., an electro-optic effect crystal such as a lithium niobate monocrystal, or an optical member constituted by a nematic liquid crystal layer may be used. In FIG. 2, WL, RL and EL denote a write light, a read light and an erase light, respectively.

FIGS. 3A to 3D are characteristic curves showing the wavelength selection characteristic of the optical member 8R having a wavelength selectivity permitting a light in the wavelength region or band of the read light to be reflected and permitting a light in the wavelength region of the erase light to be transmitted, respectively. FIG. 3 shows that the optical member 8R having a characteristic shown in FIG. 3A is constituted as an optical low-pass filter, the optical member 8R having a characteristic shown in FIG. 3B is constituted as an optical high-pass filter, the optical member 8R having a characteristic shown in FIG. 3C is constituted as an optical band-pass filter, and the optical member 8R having a characteristic shown in FIG. 3D is constituted as an optical band-rejection filter.

Namely, in the photo-to-photo conversion element previously proposed which is shown in FIG. 2, for the optical member 8R used as a part of the components thereof, i.e., the optical member 8R permitting light in the wavelength region of the read light to be reflected and permitting light in the wavelength region of the erase right to be transmitted, optical members 8R having such wavelength selectivities as shown in FIGS. 3A to 3D may be used.

In the photo-to-photo conversion element previously proposed, which is provided with the optical member 8R capable of arbitrarily having any one of the wavelength selectivities as shown in FIGS. 3A to 3D, light in a wavelength region where the transmission factor of light is low in the optical member 8R, is used as the read light to be incident to that photo-to-photo conversion element, and light in a wavelength region where the transmission factor of light is high in the optical member 8R, is used as the erase light to be incident to the photo-to-photo conversion element. Thus, the photo-to-photo conversion element previously proposed permits an erase light to be same from the incident side on which the read light is incident.

In the case of writing optical information into the photo-to-photo conversion element previously proposed which has the arrangement shown in FIG. 2, a circuit composed of power supply 10 and changeover switch SW is connected between terminals 5 and 6 of the photo-to-photo conversion element to allow the movable contact of the changeover switch SW to be switched to the fixed contact WR side by a switching control signal delivered to the input terminal 11 for the changeover control signal in the changeover switch SW. Under this condition, a voltage of the power supply 10 is applied across the transparent electrodes 3 and 4, to therefore apply an electric field across both terminals of the photoconductive layer 7. Furthermore, when the write light WL is incident from the glass plate 1 side in the photo-to-photo conversion element, writing of the optical information into the photo-to-photo conversion element will be conducted as follows.

Namely, when the write light WL incident to the photo-to-photo conversion element is transmitted through the glass plate 1 and the transparent electrode 3 to reach the photoconductive layer 7, because the electric resistance value of the photoconductive layer 7 changes in correspondence to an optical image of the incident light which has reached the photoconductive layer 7, a charge image corresponding to the optical image of the incident light which has reached the photoconductive layer 7 is produced at the boundary surface between the photoconductive layer 7 and the optical member 8R.

In order to reproduce, from the photo-to-photo conversion element, the optical information which has been written in the form of a charge image in correspondence with the optical image of the incident light in a manner as stated above, there may be employed a method to switch the movable contact of the changeover switch SW to the fixed contact WR side to apply a voltage of the power supply 10 across the transparent electrodes 3 and 4 through the terminals 5 and 6 to emit or project, from the glass plate 2 side, the read light RL having a fixed optical intensity from a light source (not shown).

Namely, since a charge image corresponding to the optical image of the incident light which has reached the photoconductive layer 7 is produced at the boundary surface between the photoconductive layer 7 and the optical member 8R in the photo-to-photo conversion element into which writing of the optical information by the incident light has been conducted as previously described, an electric field having a strength distribution corresponding to the optical image of the incident light is applied to the optical member (e.g., lithium niobate monocrystal) 9 provided so as to have a serial relationship with respect to the photoconductive layer 7 along with the optical member 8R.

Since the refractive index of the lithium niobate monocrystal 9 changes in accordance with an electric field by the electro-optic effect, the refractive index of the lithium niobate monocrystal 9 provided so as to have a serial relationship with respect to the photoconductive layer 7 along with the optical member 8R under condition where an electric field having a strength distribution corresponding to the optical image by the incident light is applied to the lithium niobate monocrystal 9, changes in accordance with a charge image produced in correspondence with the optical image of the incident light, which has reached the photoconductive layer 7, at the boundary surface between the photoconductive layer 7 and the optical member 8R in the photo-to-photo conversion element by writing of the optical information of the incident light a previously described.

Thus, when the read light RL is projected to the glass plate 2 side, the read light RL which has been projected to the glass plate 2 side goes on through the transparent electrode 4, the lithium niobate monocrystal 9 and the optical member 8R.

The above-mentioned read light RL is reflected by the optical member 8R and is then returned to the glass plate 2 side as reflected light. Since the refractive index of the lithium niobate monocrystal 9 changes in accordance with an electric field by the electro-optic effect, the reflected light of the read light RL includes pictorial image information corresponding to the strength distribution of an electric field applied to the lithium niobate monocrystal 9 by the electro-optic effect of the lithium niobate monocrystal 9, thus allowing a reproduced optical image corresponding to the optical image of the incident light to be produced on the side of the glass plate 2.

In the above-mentioned reproducing operation, the read light which has been projected from the glass plate 2 side, goes on towards the photoconductive layer 7 via the transparent electrode 4, the lithium niobate monocrystal 9 and the optical member 8R as previously described. Since the above-mentioned read light is reflected by the optical member 8R before it reaches the photoconductive layer 7, it traces an optical path including the lithium niobate monocrystal 9, the transparent electrode 4 and the glass plate 2. For this reason, there is no possibility that the read light RL reaches the photoconductive layer 7 to exert an adverse influence on the charge image of the incident light written thereinto.

As just described above, in accordance with the photo-to-photo conversion element previously proposed, write operation is carried out by allowing the write light WL to be incident from the glass plate 1 side, and the reproduction operation is carried out by allowing the read light RL to be incident to the glass plate 2 side. The method of erasing information which has been written into the previously proposed photo-to-photo conversion element shown in FIG. 2 will now be described.

In the case of erasing information written into the previously proposed photo-to-photo conversion element shown in FIG. 2, there is employed a method to switch the movable contact of the changeover switch SW to the fixed contact E side by a switching control signal delivered to the input terminal 11 for the switching control signal in the changeover switch SW connected between the terminals 5 and 6 of the photo-to-photo conversion element, to electrically short-circuit between the transparent electrodes 3 and 4 so that the transparent electrodes 3 and 4 have the same potential to cause an electric field not to be applied across both terminals of the photoconductive layer 7, to thereafter allow the erase light EL to be incident from the glass plate 2 side in the photo-to-photo conversion element.

As described above, the erase ligth EL which has been incident to the glass plate 2 side of the photo-to-photo conversion element reaches the photoconductive layer 7 via a path including the glass plate 2, the transparent electrode 4, the lithium niobate monocrystal 9, the optical member 8R, and the photoconductive layer 7 to lower the electric resistance value of the photoconductive layer 7, to thereby erase the charge image formed at the boundary surface between the photoconductive layer 7 and the optical member 8R.

As understood from the foregoing description, the previously proposed photo-to-photo conversion element shown in FIG. 2 has an arrangement such that the charge image formed at the boundary surface between the photoconductive layer 7 and the optical member 8R at the time of the writing operation is erased by the erase light same from the incident side on which the read light is incident to photo-to-photo conversion element. Thus, the photo-to-photo conversion element can be easily applied to an image pickup device of a structure such that it is required to provide the image pickup optical system on the side on which the write light WL is incident, and a device of a structure such that it is difficult to provide the incident unit for the erase light on the same side on which the write light WL is incident. Thus, this previously proposed photo-to-photo element can satisfactorily solve the problems which afflict the conventional photo-to-photo conversion element previously described with reference to FIG. 1.

Since light incident from the glass plate 1 side generally includes light in a wavelength region broader than that of visible light, it includes light in a wavelength region of the erase light EL incident from the glass plate 2 side at the time of erasing.

In the case where light in a wavelength region determined so that it is used as the erase light is included in the light incident from the glass plate 1 side into the photo-to-photo conversion element as described above, that light is transmitted through the optical member 8R having a wavelength selectivity permitting a light in the wavelength region of the read light to be reflected and permitting a light in the wavelength region of the erase light to be transmitted, and is then emitted from the photo-to-photo conversion element via the lithium niobate monocrystal 9, the transparent electrode 4, and the glass plate 2.

Thus, in the case where a light in a wavelength region determined so that it is used as the erase light EL is included in a light incident from the glass plate 1 side into the photo-to-photo conversion element under condition where the read or reproduce light RL is incident, to the glass plate 2 side for allowing the photo-to-photo conversion element to carry out the reproducing operation, that light is transmitted through the optical member 8R and is emitted from the photo-to-photo conversion element via the lithium niobate monocrystal 9, the transparent electrode 4 and the glass plate 2. For this reason, the reproduced optical information from the photo-to-photo conversion element includes optical information based on light in the wavelength region of the erase light EL included in the light incident from the glass plate 1 side in addition to the original reproduced optical information obtained as a result of the fact that the read or reproduce light RL incident to the glass plate 2 side for allowing the photo-to-photo conversion element to carry out the reproducing operation is emitted from the photo-to-photo conversion element via the glass plate 2, the lithium niobate monocrystal 9, the optical member 8R, the lithium niobate monocrystal 9, the transparent electrode 4, and the glass plate 2, resulting in the problem that correct reproduction operation is not carried out. A further problem is as follows. Light having a wavelength longer than that of visible light is ordinarily used. However, the fact that light having a wavelength longer than that of visible light is included in the reproduced information is dangerous to the human eye. Thus, it has been required to take countermeasures with respect to this.

SUMMARY OF THE INVENTION

Accordingly, an object of this invention is to provide a photo-to-photo conversion element constituted so that it does not exert an adverse influence on the human eye even when an erase light having a wavelength longer than that of visible light is used.

In accordance with this invention, there is provided a photo-to-photo conversion element comprising, in an arranged sequence in line: a first optical member having a wavelength selectivity permitting to pass a write light having a first wavelength range, and to block an erase light; a first transparent electrode; a photoconductive layer; a second optical member having a wavelength selectivity permitting to reflect a read light having a second wavelength range and to pass the erase light; a third optical member for electrooptically modulating a light incident thereto through the second optical member in response to the strength distribution of an electric field applied thereto; and a second transparent electrode; the erase light having a wavelength outside of both the first and second wavelength ranges.

The photo-to-photo conversion element according to this invention is constituted so that a charge image formed at the boundary surface between the photoconductive layer 7 and the second optical member (having a wavelength selectivity permitting a read light in a wavelength region of the visible light to be reflected and permitting light in a wavelength region of an erase light having a wavelength longer than visible light to be transmitted) 14 at the time of writing is erased by the erase light same from the incident side on which the read light is incident in the photo-to-photo conversion element into the photo-to-photo conversion element. Thus, the photo-to-photo conversion element of this invention can be readily applied to an image pickup device of a structure such that it is required to provide an image pickup optical system on the side of which the write light WL is incident, and a device of a structure such that it is difficult to provide an incident unit for the erase light on the side on which the write light WL is incident. In this instance, the write light in the wavelength region of visible light cannot be transmitted through the second optical member, and the second optical member has a wavelength selectivity permitting the erase light having a wavelength longer than that of the write light or the read light in the wavelength region of visible light to be transmitted. However, since light having a wavelength longer than that of the write light in the wavelength region of the visible light incident to the glass plate 1 side of an incident light does not reach the second optical member due to the presence of the first optical member having a wavelength selectivity permitting light having a wavelength longer than that of the write light in the wavelength region of visible light to be reflected or absorbed, even if an incident light in a broad wavelength region is incident from the glass plate 1 side into the photo-to-photo conversion element under the condition where the photo-to-photo conversion element is carrying out read operation, there is no possibility that any adverse influence would be exerted on information read by that light, and that the human eye would be damaged by light having a wavelength longer than that of visible light. Thus, this invention can satisfactorily solve all the problems encountered with the conventional photo-to-photo conversion element and the previously proposed photo-to-photo conversion element.

BRIEF DESCRIPTION OF THE DRAWINGS

In the accompanying drawings.

DESCRIPTION OF THE PREFERRED EMBODIMENTS

Figure 1:
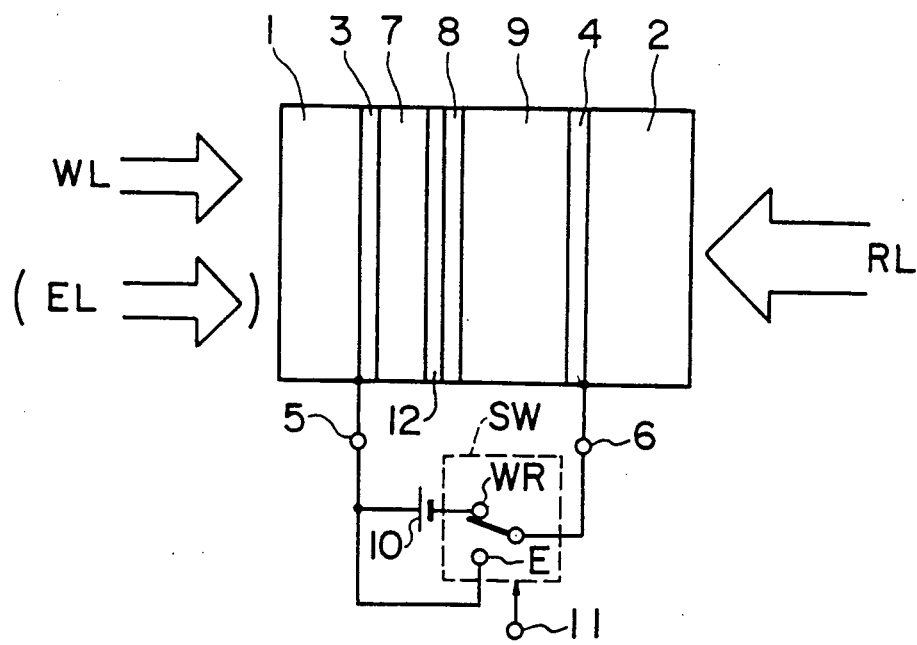
FIG. 1 is a side cross sectional view showing a conventional photo-to-photo conversion element.
Figure 2:
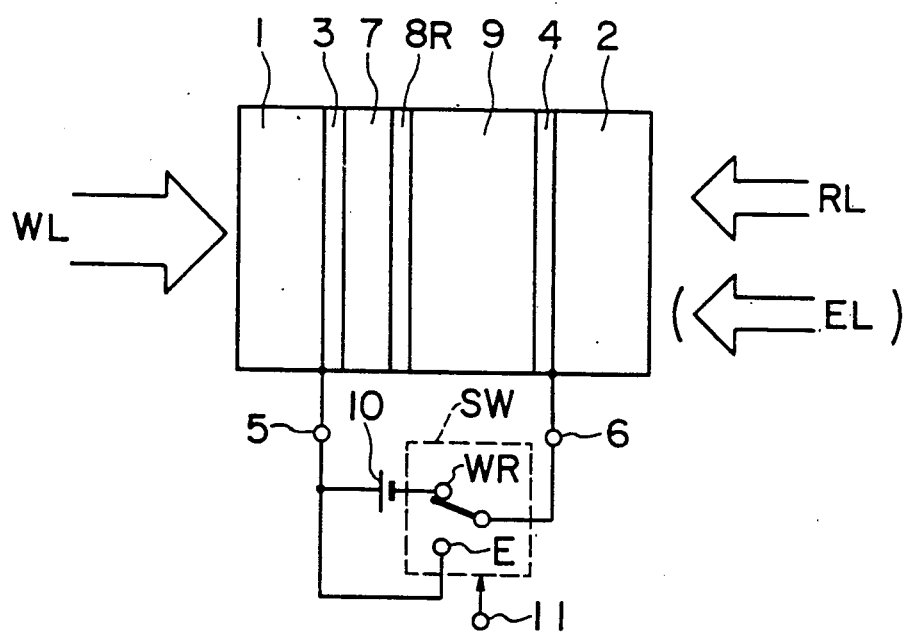
FIG. 2 is a side cross sectional view showing a photo-to-photo conversion element previously proposed.
Figure 3A:
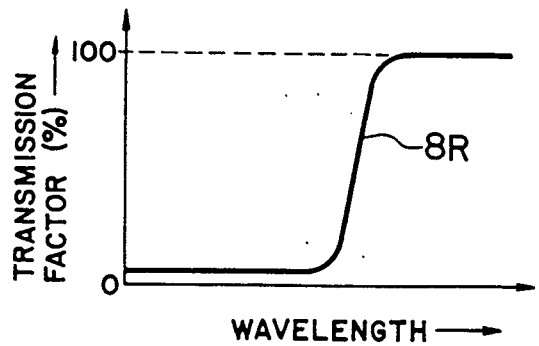
FIGS. 3A to 3D are characteristic curves showing the transmission factor of light with respect to the wavelength of a light of an optical member used in the arrangement of the previously proposed photo-to-photo conversion element shown in FIG. 2, respectively.
Figure 3B:
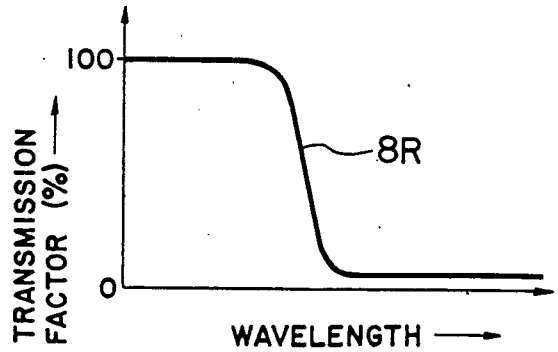
Figure 3C:
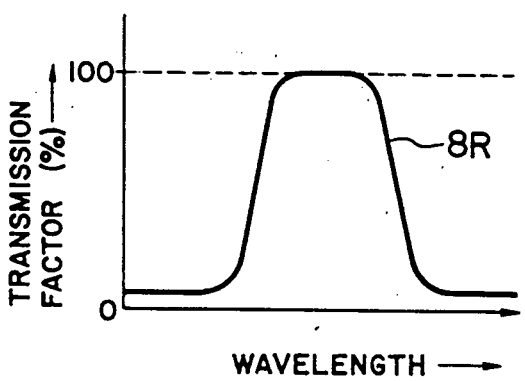
Figure 3D:
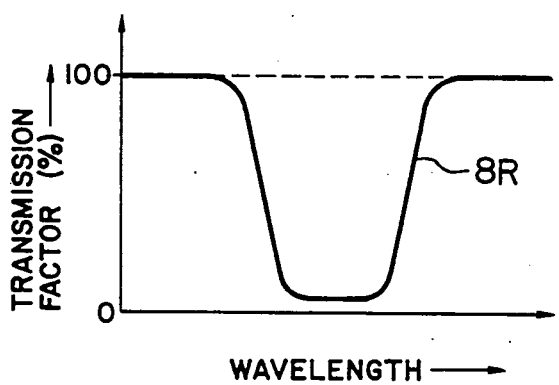
Figure 4:
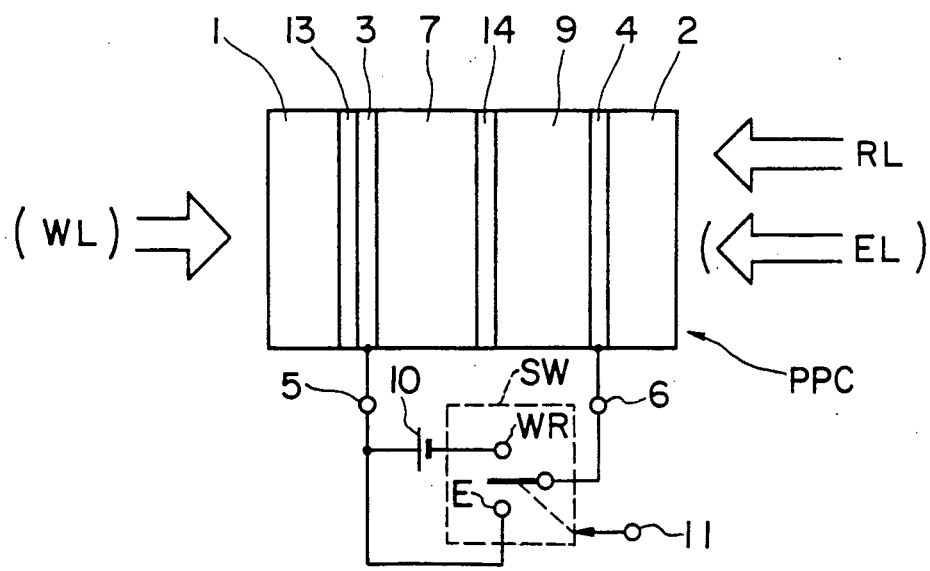
FIG. 4 is a side cross sectional view showing an embodiment of a photo-to-photo conversion element according to this invention.

Referring to FIG. 4, there is shown an embodiment of a photo-to-photo conversion element of a structure comprising, in a stacked manner, a glass plate 1, a first optical member 13 having a wavelength selectivity permitting passage of to pass a write light in the wavelength region of the visible light as an incident light and permitting to block blocking of an erase light having a wavelength longer than that of the write light in the wavelength region of the visible light, a first transparent electrode 3, a photoconductive layer 7, a second optical member 14 having a wavelength selectivity permitting reflection of to reflect a read light in the wavelength region of visible light and permitting the erase light to be transmitted, an optical member 9 for changing the state of light in accordance with a strength distribution of an electric field applied, a second transparent electrode 4, and a glass plate 2. The first and second transparent electrodes are connected to terminals 5 and 6, respectively. In the above structure, the first optical member need not be attached to the first transparent electrode 3 but may simply be placed before the first transparent electrode 3 along a path of the write light. Further, the second optical member may be formed as an integral part of the photoconductive layer.

Figures 5, 6:
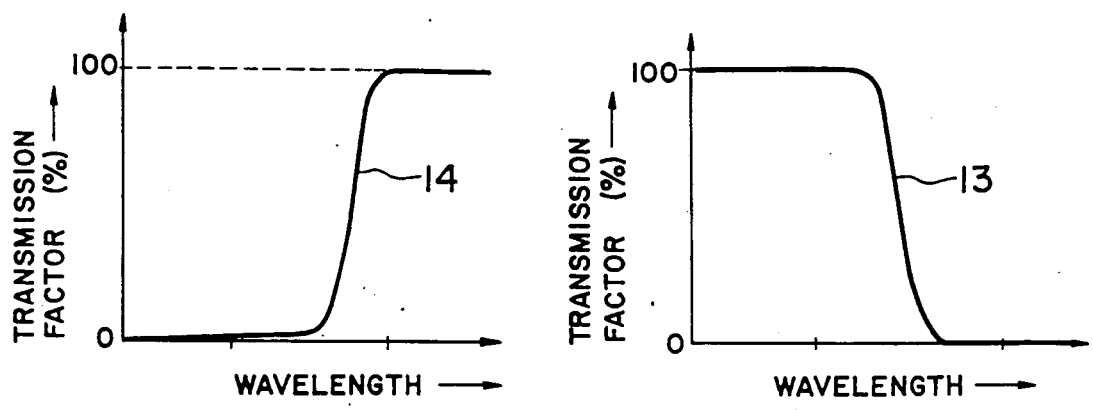
FIGS. 5 to 8 are characteristic curve diagrams showing the transmission factor of light with respect to the wavelength of light of the optical member used in the arrangement of the photo-to-photo conversion element shown in FIG. 1.
Figures 7, 8:
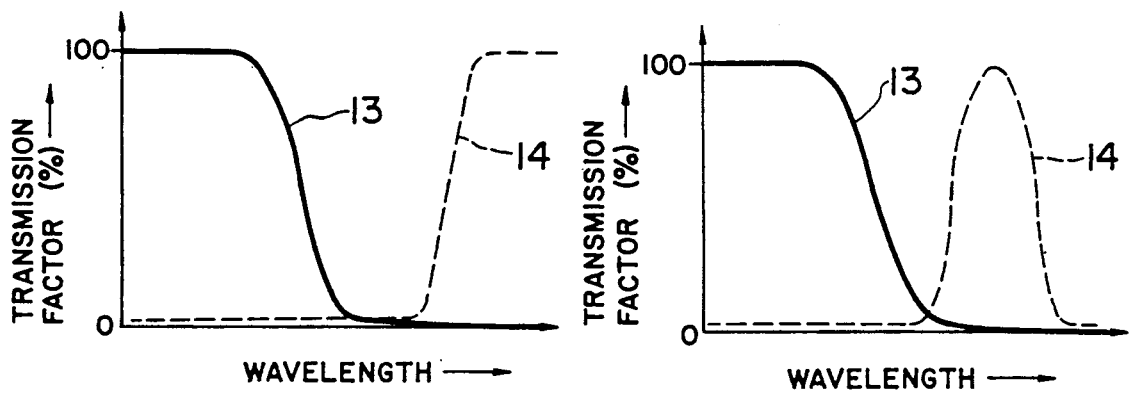

FIGS. 5 to 8 are characteristic curves showing the transmission factor of light with respect to the wavelength of light in the first and second optical members 13 and 14, respectively. The characteristic curves designated by reference numeral 14 in FIGS. 5, 7 and 8 show examples of the transmission factor of light with respect to the wavelength of light in the second optical member 14, respectively. In addition, the characteristic curves designated by reference numeral 13 in FIGS. 6, 7 and 8 show examples of the transmission factor of light with respect to the first optical member 13, respectively.

For the first and second optical members 13 and 14, for example, members constituted by a dichroic filter of a multilayer film consisting of a thin film of $SiO_2$ and a thin film of $TiO_2$ may be used, respectively.

For the optical member 9 for changing the state of light according to the strength distribution of an electric field, for example, an optical member constituted by an electro-optic effect crystal such as a lithium niobate monocrystal or a nematic liquid crystal layer may be used. In FIG. 4, WL, RL and EL denote a write light, a read light and an erase light, respectively.

In the case of writing optical information into the photo-to-photo conversion element of this invention which has the arrangement shown in FIG. 4, a circuit composed of power supply 10 and changeover switch SW is connected between terminals 5 and 6 of the photo-to-photo conversion element to allow the movable contact of the changeover switch SW to be switched to the fixed contact WR side by a switching control signal delivered t the input terminal 11 for the changeover control signal in the changeover switch SW. Under this condition, a voltage of the power supply 10 is applied across the transparent electrodes 3 and 4, to so that the photoconductive layer 7, the second optical member 14 and the optical member 9 interposed therebetween, become electrostatically biased together. When the write light WL is then caused to be incident from the glass plate 1 side in the photo-to-photo conversion element, writing of the optical information into the photo-to-photo conversion element will be performed as follows.

The light incident from the glass plate 1 side to the photo-to-photo conversion element at the time of the write operation is a light in a broad wavelength region including light in the wavelength region of visible light. The write light WL propagates along an optical path including the glass plate 1, the first optical member 13, the first transparent electrode 3, and reaches the photoconductive layer 7. On the other hand, the first optical member 13 provided in the middle of the optical path from the glass plate 1 to the photoconductive layer 7 has a wavelength selectivity as shown in FIGS. 6 to 8, i.e., a wavelength selectivity permitting light having a wavelength longer than that of the write light WL to be reflected or absorbed. Thus, a light having a wavelength longer than that of the write light WL cannot reach the photoconductive layer 7 through the first optical member 13.

The second optical member 14 is constituted as a member having a wavelength selectivity permitting the read light in the wavelength region of visible light to be reflected and permitting the erase light having a wavelength longer than that of visible light to be passed. In this regard, the second optical member 14 may have a bandpass characteristic as shown in FIG. 8 to pass only the erase light. And the write light WL in the wavelength region of the visible light which has been transmitted through the above-described first optical member 13, i.e., the light which has reached the second optical member 14 via the glass plate 1, the first optical member 13, the first transparent electrode 3, and the photoconductive layer 7, is also reflected by the second optical member 14. Thus the write light WL in the wavelength region of the visible light does not pass through the second optical member 14.

When the write light WL incident to the photo-to-photo conversion element is transmitted through the glass plate 1, the first optical member 13 and the first transparent electrode 3 to reach the photoconductive layer 7 as stated above, the electric resistance of the photoconductive layer 7 along a depth direction thereof varies in correspondence with an intensity distribution corresponding to an optical image formed according to the write light which has reached the photoconductive layer 7. As a result, a charge image (image of electrostatic charge) corresponding to the optical image of the write light WL is produced at the boundary surface between the photoconductive layer 7 and the second optical member 14.

In order to reproduce the optical information written in the form of the charge image corresponding to the optical image of the write light WL in a manner stated above, the movable contact of the changeover switch SW is switched to the fixed contact WR side. Under this condition, a voltage of the power supply 10 is applied across the first and second transparent electrodes 3 and 4 through the terminals 5 and 6. Then, read light RL having a fixed light intensity is projected from a light source (not shown) toward the glass plate 2 side in the photo-to-photo conversion element to perform such a reproducing operation.

The charge image corresponding to the optical image produced at the boundary surface between the photoconductive layer 7 and the second optical member 14 causes the adjacent optical member (e.g., lithium niobate monocrystal) 9 to be subject to an electrostatic field of the charge image corresponding to the optical image formed according to the white light.

Since the refractive index of the lithium niobate monocrystal 9 changes in accordance with an electric field due to the electro-optical effect, a refraction characteristic (birefringence characteristic in the case of the electro-optical Kerr effect possessed by the optical member) along the surface of the lithium niobate monocrystal 9 is changed or modulated correspondingly with the electrostatic field generated by the charge image.

Thus, when the read light RL is projected to the glass plate 2 side, the read light RL propagates on through the second transparent electrode 4, the lithium niobate monocrystal 9, and the second optical member 14 by which the read light RL is reflected and then returned to the glass plate 2 and exits therefrom as reflected light. As a result, the reflected read light holds an electro-optically modulated pictorial image information corresponding to the electrostatic field applied to the lithium niobate monocrystal 9, so that the optical image written into the photo-to-photo conversion element PPC by the write light WL is read out by the read light RL and outputted from the side of the glass plate 2 as a reflected light.

As the second optical member 14 is reflective to the read light RL projected thereto, the read light RL never proceeds beyond the second optical member 14. For this reason, there is no possibility that the read light RL will reach the photoconductive layer 7 to cause an adverse effect on the charge image previously written thereinto.

A method of erasing information which has been written into the photo-to-photo conversion element of this invention will now be described.

In the case of erasing information, i.e. the charge image written into the photo-to-photo conversion element of this invention shown in FIG. 4, there is employed a method to switch the movable contact of the changeover switch SW to the fixed contact E side by a switching control signal delivered to the input terminal 11. This causes the transparent electrodes 3 and 4 to be electrically short-circuited through the terminals 5 and 6, so that the transparent electrodes 3 and 4 read the a same potential, whereby the photoconductive layer 7, the second optical member 14, and the optical member 9 interposed between the two electrodes become no longer electrostatically biased. Under this condition, the erase light EL of uniform intensity and longer wavelength than that of the read write RL is projected to the glass plate 2 side of the photo-to-photo conversion element and reaches the photoconductive layer 7 via a path including the glass plate 2, the second transparent electrode 4, the optical member 9, and the second optical member 14, causing an entire body of the photoconductive layer 7 to lower its electric resistance, so that the charge image formed at the boundary surface between the photoconductive layer 7 and the second optical member 14 becomes dissipated, and no electrostatic charge remains at the boundary. After the erasure, the photo-to-photo conversion element is ready to begin a subsequent writing operation as no charge image or electrostatic charge (DC components) remains.

Since the erase light is projected to the side opposite to the side on which the write light WL enters, this invention is easily applicable to an image pickup device of a structure in which an image pickup optical system occupies a space adjoining the side on which the write light WL is incident or to a device of a structure which cannot allow provision of the erasing system hardware at the side at which the write light WL is incident for some reason. As the second optical member 14 is reflective to the write light WL, the latter does not go beyond the second optical member 14 so that it does not disturb the reading operation if it enters into the photo-to-photo conversion element PPC in the reading operation. Also, even if an incident light in a broad wavelength region is incident to the photo-to-photo element during the read operation, there is no possibility of a harmful effect of the light having a wavelength longer than that of the visible light to the human eye looking into the photo-to-photo conversion element PPC.

Regarding the projection of the erase light EL, the erase light EL may not necessarily be projected from the side to which the read light RL is projected but may be projected to the photoconductive layer 7 from the opposite side with respect to the second optical member 14 by suitable means or along any path directed toward the photoconductive layer 7 from the opposite side, which includes a light path along which the write light WL is incident to the photoconductive layer. When this is the case, the second optical member 14 does not necessarily pass the erase light EL but is simply reflective at least to the reading light RL, or reflective to both the reading light RL and the erase light EL.

Figure 9:
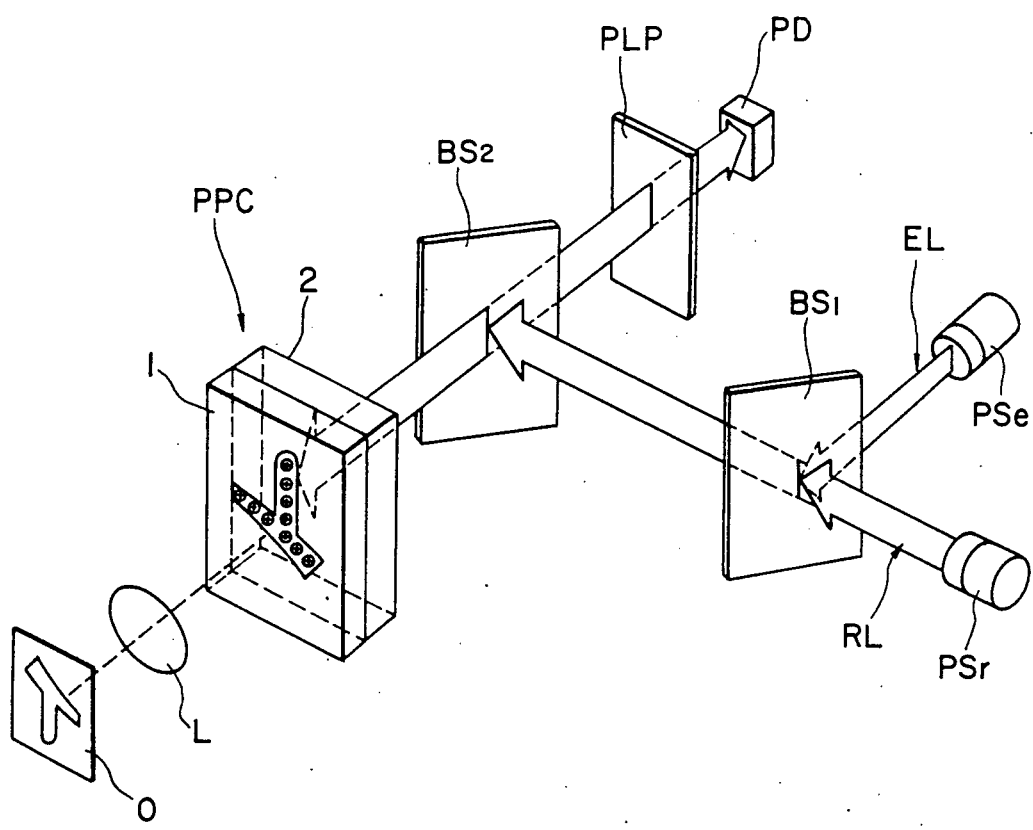
FIG. 9 is a perspective view showing an image pickup device constituted with the photo-to-photo conversion element.

FIG. 9 is a perspective view of an image pickup device constituted with the photo-to-photo conversion element PPC of this invention.

In this photo-to-photo conversion element shown in FIG. 9, the surface side of the glass plate 1 to which the write light labeled WL in FIG. 4 is incident is designated by reference numeral 1 and the surface side of the glass plate to which the read light labeled RL and the erase light labeled EL in FIG. 4 are incident is designated by reference numeral 2, to clarify the corresponding relationship between the photo-to-photo conversion element PPC in FIG. 4 and that in FIG. 9 and to omit the actual indication of other components in the photo-to-photo conversion element PPC for brevity of illustration.

Referring to FIG. 9, the image pickup device of this invention includes an imaging lens L for forming an image of an object O, beam splitters BS1 and BS2, a light source PSr for the read light RL (e.g., a flying spot scanner using a laser light may be used for the light source PSr for the read light, and such a flying spot scanner system is assumed to be used for the light source PSr in the following description), a light source PSe for the erase light EL, a polarizing plate PLP, and a photo detector PD. In the image pickup device constituted with the photo-to-photo conversion element PPC illustrated in FIG. 9, an optical image of the object is incident from the glass plate 1 side as a write light to the photo-to-photo conversion element PPC by way of the imaging lens L.

A voltage of the power supply 10 is applied across the first and second transparent electrodes 3 and 4 in the photo-to-photo conversion element PPC set in the write mode and in the read mode through changeover switch SW placed in the state where the movable contact is switched to the fixed contact WR side as shown in FIG. 4. Accordingly, in the photo-to-photo conversion element constituted so that light corresponding to an optical image of the object is incident to the glass plate 1 side through the imaging lens L, as previously described, light incident from the glass plate 1 side to the photo-to-photo conversion element at the time of the writing operation is a light having a broad wavelength range including the range of visible light. The light which passes along an optical path including the glass plate 1, the first optical member 13 and the first transparent electrode 3 reaches the photoconductive layer 7, which is electrostatically biased as explained before.

As a result, a charge image corresponding to the optical image of the incident light is formed on the boundary surface between the photoconductive layer 7 and the second optical member 14.

Under the condition that electrostatic bias is applied between the first and second transparent electrodes 3 and 4, the reading operation of the written information is performed from the glass plate 2 side. A coherent read light RL radiated from the light source PSr is projected to a beam splitter BS1, then is reflected by a beam splitter BS2 toward the glass plate 2 side of the photo-to-photo conversion element PPC. The read light RL further proceeds to the second transparent electrode 4, the optical member 9 of which may be lithium niobate monocrystal, and then to the second optical member 14.

The read light RL is reflected by the second optical member 14 and returns toward the glass plate 2 passing through a body of the optical member 9 while being modulated electro-optically due to the electro-optical effect generated in the optical member 9 by the charge image formed in the writing operation. The reflected light thus electro-optically modulated propagates toward the beam splitter 2, penetrating it to further pass the polarizing plate PLP where the electro-optically modulated light is converted to an intensity modulated light, then is forwarded to the photo detector PD for demodulation, whereby it is reproduced as an electrical signal corresponding to the optical image previously written.

In the case where a laser beam flying spot scanner is used as the light source PSr for the read light RL, the reflected light appearing from the glass plate 2 is a kind of two-dimensional image constituted by electro-optically modulated flying spot. Accordingly, a video signal corresponding to the optical image of the object O will be outputted from the photo detector PD.

Writing and reading a series of mutually different picture images at a predetermined interval to produce corresponding frame intervals of a video signal, it is required to erase each of the formed charge images at the predetermined interval, before forming the subsequent charge image of a new object to be written.

Such an erasing operation is performed in correspondence with the vertical blanking interval of the video signal to be outputted from the photo detector PD in such a manner that the movable contact of the change-over switch SW is operated by a switching control signal delivered to the input terminal 11, and the erase light EL is intermittently projected at an appropriate timing, both performed in correspondence with the vertical blanking interval of the video signal.

What is claimed is:

1. A photo-to-photo conversion element comprising, in an arranged sequence in line;
   a first optical member for passing a write light having a first wavelength range;
   a first transparent electrode;
   a photoconductive layer;
   a second optical member having a wavelength selectively reflecting a light in a wavelength band in which a read light having a second wavelength falls;
   a third optical member for electrooptically modulating a light incident thereto through the second optical member in response to the strength distribution of an electric field applied thereto; and
   a second transparent electrode.

2. A photo-to-photo conversion element as set forth in claim 1, wherein said second optical member is constituted by a dichroic filter of a multilayer film comprising a thin film of $SiO_2$ and a thin film of $TiO_2$.

3. A photo-to-photo conversion element as set forth in claim 1, wherein said third optical member for electrooptically modulating the light incident thereto is constituted by an electro-optical effect crystal such as a lithium niobate monocrystal or a nematic liquid crystal.

* * * * *